(12) United States Patent
Yoshii

(10) Patent No.: US 8,442,975 B2
(45) Date of Patent: May 14, 2013

(54) IMAGE MANAGEMENT APPARATUS

(75) Inventor: Kazuto Yoshii, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 0 days.

(21) Appl. No.: 13/177,124

(22) Filed: Jul. 6, 2011

(65) Prior Publication Data

US 2012/0011114 A1  Jan. 12, 2012

(30) Foreign Application Priority Data

Jul. 7, 2010  (JP) ................. 2010-154708

(51) Int. Cl.
*G06F 7/00* (2006.01)
*G06F 17/30* (2006.01)

(52) U.S. Cl.
USPC .......................................... 707/723; 382/190

(58) Field of Classification Search .................. 707/723; 382/118, 190
See application file for complete search history.

(56) References Cited

U.S. PATENT DOCUMENTS

| | | | | |
|---|---|---|---|---|
| 2005/0105806 | A1* | 5/2005 | Nagaoka et al. | 382/224 |
| 2007/0003267 | A1* | 1/2007 | Shibutani | 396/123 |
| 2008/0075338 | A1* | 3/2008 | Muramatsu et al. | 382/118 |
| 2008/0086511 | A1* | 4/2008 | Takao et al. | 707/104.1 |
| 2008/0091749 | A1* | 4/2008 | Kitamaru | 707/205 |
| 2010/0310135 | A1* | 12/2010 | Nagaoka et al. | 382/118 |
| 2012/0036132 | A1* | 2/2012 | Doyle | 707/738 |

FOREIGN PATENT DOCUMENTS

| | | |
|---|---|---|
| JP | 2007-022838 A | 2/2007 |
| JP | 2007-329679 A | 12/2007 |
| JP | 2008-181303 A | 8/2008 |

\* cited by examiner

*Primary Examiner* — Robert Beausoliel, Jr.
*Assistant Examiner* — Nicholas Allen
(74) *Attorney, Agent, or Firm* — Westerman, Hattori, Daniels & Adrian, LLP

(57) ABSTRACT

An image processing apparatus includes a designator which designates each of one or more characteristic images included in a scene image as a reference characteristic image. A searcher searches for a specific folder in which a dictionary image adapted to the reference characteristic image is associated with, from among one or more folders in which one or more dictionary images are respectively associated with. A first storage stores the scene image noticed by the designator into the specific folder discovered by the searcher. A first creator creates a folder in which a dictionary image equivalent to the reference characteristic image is associated with, corresponding to non-discovering the specific folder by the searcher. A second storage executes a process of storing the scene image noticed by the designator into the folder created by the first creator, in association with a creating process of the first creator.

10 Claims, 20 Drawing Sheets

FIG.5
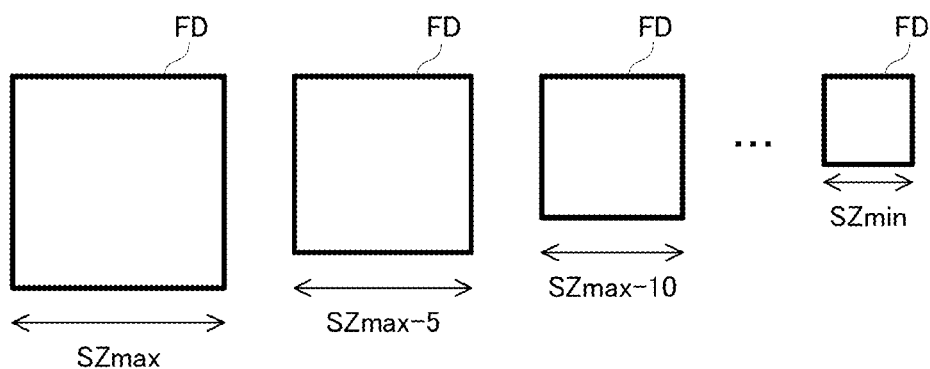
FIG.6
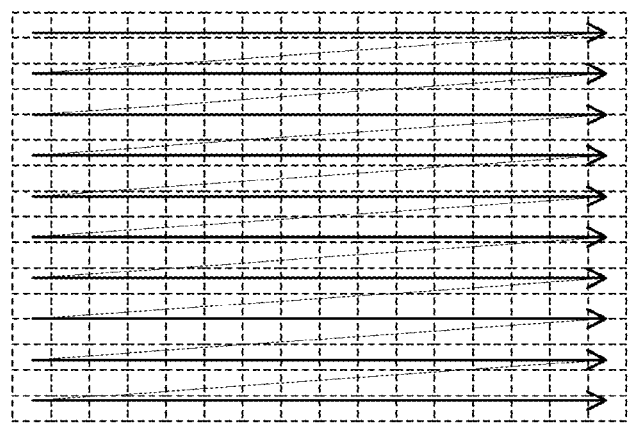
FIG.7

RGST2

|  | 1 | 2 | 3 | ... |
|---|---|---|---|---|
| FOLDER NAME |  |  |  |  |
| MATCHING DEGREE |  |  |  |  |

RGST3

|  | 1 | 2 | 3 | ... |
|---|---|---|---|---|
| FACE-DETECTION FRAME STRUCTURE No. |  |  |  |  |

RGST2

|  | 1 | 2 | 3 | ... |
|---|---|---|---|---|
| FOLDER NAME | 501 | 503 | | |
| MATCHING DEGREE | 80 | 95 | | |

RGST4

| | 1 | 2 | 3 | ... |
|---|---|---|---|---|
| FACE-DETECTION FRAME STRUCTURE No. | 1 | 2 | 3 | |
| FOLDER NAME | 502 | 503 | 502 | |
| MATCHING DEGREE | 90 | 95 | 75 | |

| FFDC | | | | |
|---|---|---|---|---|
| FOLDER NAME | 501 | 502 | 503 | 504 |
| FACE IMAGE |  |  |  |  |

IMAGE MANAGEMENT APPARATUS

CROSS REFERENCE OF RELATED APPLICATION

The disclosure of Japanese Patent Application No. 2010-154708, which was filed on Jul. 7, 2010, is incorporated here by reference.

BACKGROUND OF THE INVENTION

1. Field of the Invention

The present invention relates to an image management apparatus. More particularly, the present invention relates to an image management apparatus which manages an image by using a folder.

2. Description of the Related Art

According to one example of this type of image management apparatus, a face recognizing section recognizes a face of a person included in a target image. An image classifying section classifies the target image based on a result of a face recognition performed by the face recognizing section. The target image is stored in a folder previously created in an HDD for each person, corresponding to a classified result.

However, in the above-described apparatus, it is necessary to previously create the folder for each person, and it is not considered to manage a photographed image including a characteristic image of the person etc. for whom a corresponding folder is not prepared. Thus, in the above-described apparatus, managing the photographed image might not he performed depending on the characteristic image included in the photographed image.

SUMMARY OF THE INVENTION

An image management apparatus according to the present invention, comprises: a designator which designates each of one or at least two characteristic images included in a photographed image as a reference characteristic image; a searcher which searches for a specific folder in which a dictionary image adapted to the reference characteristic image is associated with, from among one or at least two folders in which one or at least two dictionary images are respectively associated with; a first storage which stores the photographed image noticed by the designator into the specific folder discovered by the searcher; a first creator which creates a folder in which a dictionary image equivalent to the reference characteristic image is associated with, corresponding to non-discovering the specific folder by the searcher; and a second storage which executes a process of storing the photographed image noticed by the designator into the folder created by the first creator, in association with a creating process of the first creator.

According to the present invention, a computer program embodied in a tangible medium, which is executed by a processor of an image management apparatus, the program comprises: a designating instruction to designate each of one or at least two characteristic images included in a photographed image as a reference characteristic image; a searching instruction to search for a specific folder in which a dictionary image adapted to the reference characteristic image is associated with, from among one or at least two folders in which one or at least two dictionary images are respectively associated with; a first storing instruction to store the photographed image noticed based on the designating instruction into the specific folder discovered based on the searching instruction; a first creating instruction to create a folder in which a dictionary image equivalent to the reference characteristic image is associated with, corresponding to non-discovering the specific folder based on the searching instruction; and a first creating instruction to create a folder associated with the dictionary image equivalent to the reference characteristic image, corresponding to non-discovering the specific folder based on the searching instruction; and a second storing instruction to execute a process of storing the photographed image noticed by the designator into the folder created based on the first creating instruction, in association with a creating process based on the first creating instruction.

According to the present invention, an image managing method executed by an image management apparatus, the image managing method, comprises: a designating step of designating each of one or at least two characteristic images included in a photographed image as a reference characteristic image; a searching step of searching for a specific folder in which a dictionary image adapted to the reference characteristic image is associated with, from among one or at least two folders in which one or at least two dictionary images are respectively associated with; a first storing step of storing the photographed image noticed by the designating step into the specific folder discovered by the searching step; a first creating step of creating a folder in which a dictionary image equivalent to the reference characteristic image is associated with, corresponding to non-discovering the specific folder by the searching step; and a second storing step of executing a process of storing the photographed image noticed by the designating step into the folder created by the first creating step, in association with a creating process of the first creating step.

The above described features and advantages of the present invention will become more apparent from the following detailed description of the embodiment when taken in conjunction with the accompanying drawings.

BRIEF DESCRIPTION OF THE DRAWINGS

FIG. 5 is an illustrative view showing one example of a configuration of a face-detection frame structure register applied to the embodiment in FIG. 2;

FIG. 6 is an illustrative view showing one example of a face-detection frame structure used in an imaging task;

FIG. 7 is an illustrative view showing one example of a face detection process in the imaging task;

DETAILED DESCRIPTION OF THE PREFERRED EMBODIMENTS

Figure 1:
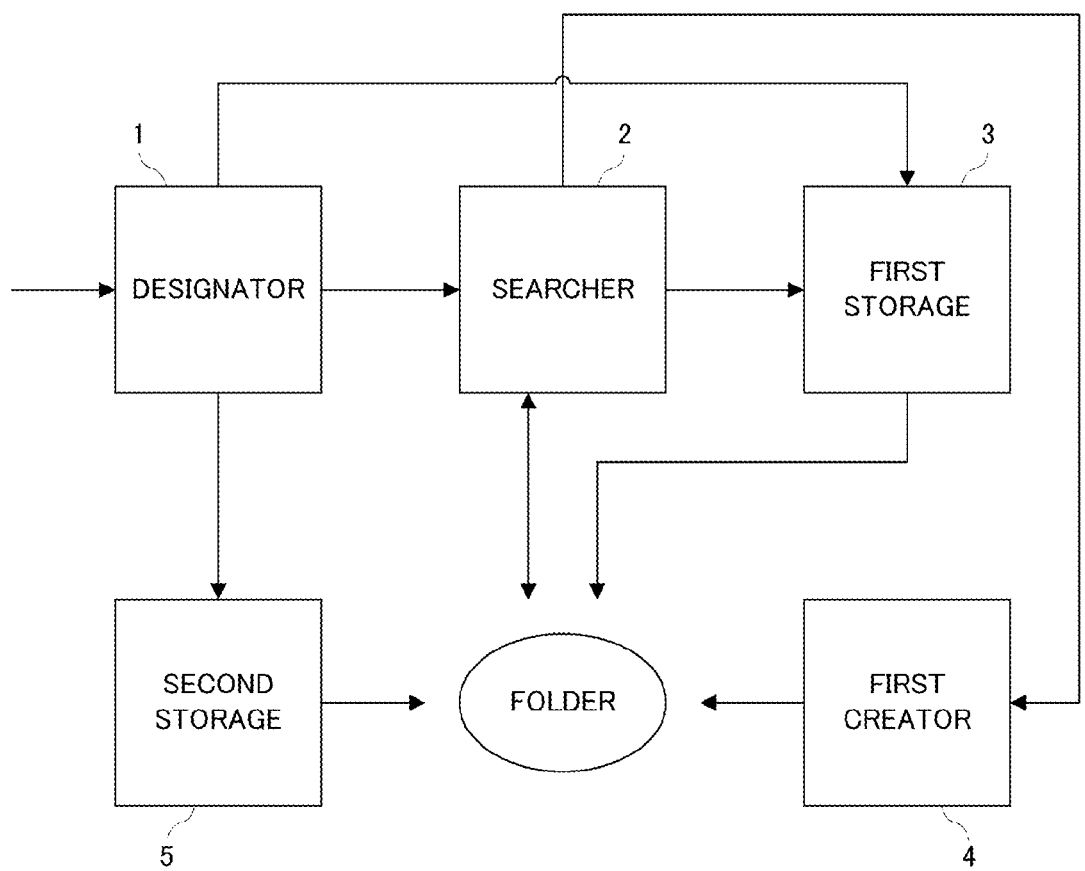
FIG. 1 is a block diagram showing a basic configuration of one embodiment of the present invention.

With reference to FIG. 1, an image management apparatus according to one embodiment of the present invention is basically configured as follows: A designator 1 designates each of one or at least two characteristic images included in a scene image as a reference characteristic image. A searcher 2 searches for a specific folder in which a dictionary image adapted to the reference characteristic image is associated with, from among one or at least two folders in which one or at least two dictionary images are respectively associated with. A first storage 3 stores the scene image noticed by the designator 1 into the specific folder discovered by the searcher 2. A first creator 4 creates a folder in which a dictionary image equivalent to the reference characteristic image is associated with, corresponding to non-discovering the specific folder by the searcher 2. A second storage 5 executes a process of storing the scene image noticed by the designator 1 into the folder created by the first creator 4, in association with a creating process of the first creator 4.

Thus, the specific folder is equivalent to a folder in which a dictionary image adapted to a characteristic image included in the scene image is associated with. When the specific folder is discovered, the scene image is stored into the specific folder. On the other hand, when the specific folder is not discovered, another folder in which a dictionary image equivalent to the characteristic image included in the scene image is associated with is created so as to store the scene image. Thereby, it becomes possible to manage the scene image for each characteristic image.

Figure 2:
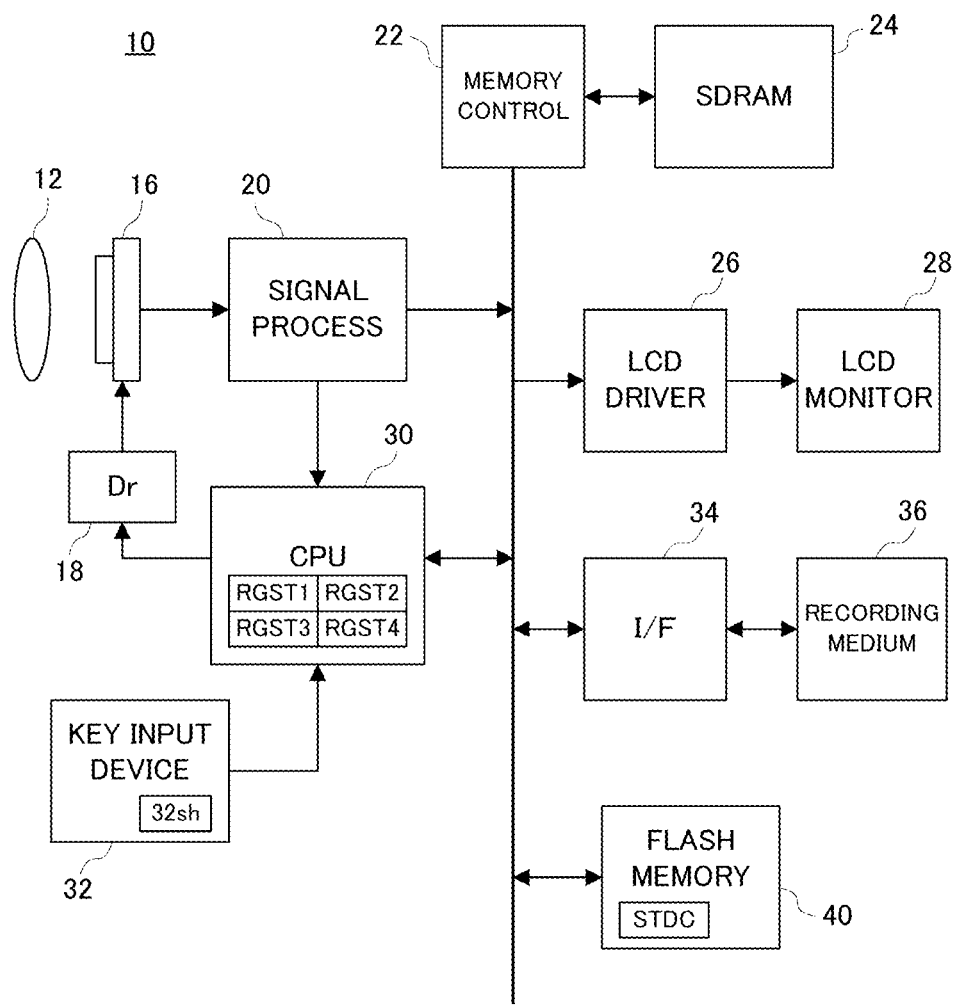
FIG. 2 is a block diagram showing a configuration of one embodiment of the present invention.

With reference to FIG. 2, a digital camera 10 according to one embodiment includes a focus lens 12 driven by a driver 18. An optical image of a scene that underwent these components enters, with irradiation, the imaging surface of an image sensor 16 and is subjected to a photoelectric conversion. Thereby, electric charges representing the scene image are produced.

When a power source is applied, in order to start a moving-image taking process under an imaging task, a CPU 30 commands the driver 18 to repeat an exposure procedure and an electric-charge reading-out procedure. In response to a vertical synchronization signal Vsync periodically generated from an SG (Signal Generator) not shown, the driver 18 exposes the imaging surface and reads out the electric charges produced on the imaging surface in a raster scanning manner. From the image sensor 16, raw image data based on the read-out electric charges is outputted periodically.

A signal processing circuit 20 performs processes, such as white balance adjustment, color separation, and YUV conversion, on the raw image data outputted from the image sensor 16, and writes YUV formatted-image data generated thereby into an SDRAM 24 through a memory control circuit 22. An LCD driver 26 repeatedly reads out the image data stored in the SDRAM 24 through the memory control circuit 22 so as to drive an LCD monitor 28 based on the read-out image data. As a result, a moving image representing the scene is displayed on a monitor screen.

Out of the image data generated by the signal processing circuit 20, Y data is also applied to the CPU 30. The CPU 30 performs a simple AE process on the applied Y data so as to calculate an appropriate EV value. An aperture amount and an exposure time period that define the calculated appropriate EV value are set to the driver 18, and thereby, a brightness of the moving image is adjusted approximately.

When a shutter button 32sh is half depressed, the CPU 30 performs a strict AE process on the Y data applied from the signal processing circuit 20 so as to calculate an optimal EV value. Similarly to the above-described case, an aperture amount and an exposure time period that define the calculated optimal EV value are set to the driver 18. As a result, the brightness of the moving image is adjusted strictly. Moreover, the CPU 30 performs an AF process on a high-frequency component of the Y data applied from the signal processing circuit 20. Thereby, the focus lens 12 is placed at a focal point, and as a result, a sharpness of the moving image is improved.

When the shutter button 32sh is fully depressed, the CPU 30 commands an I/F 34 to execute a recording process. The I/F 34 reads out one frame of the image data for recording representing the scene at a time point at which the shutter button 32sh is operated, from the SDRAM 24 through the memory control circuit 22, and writes an image file including the read-out image data for recording into a recording medium 36.

Figure 3:
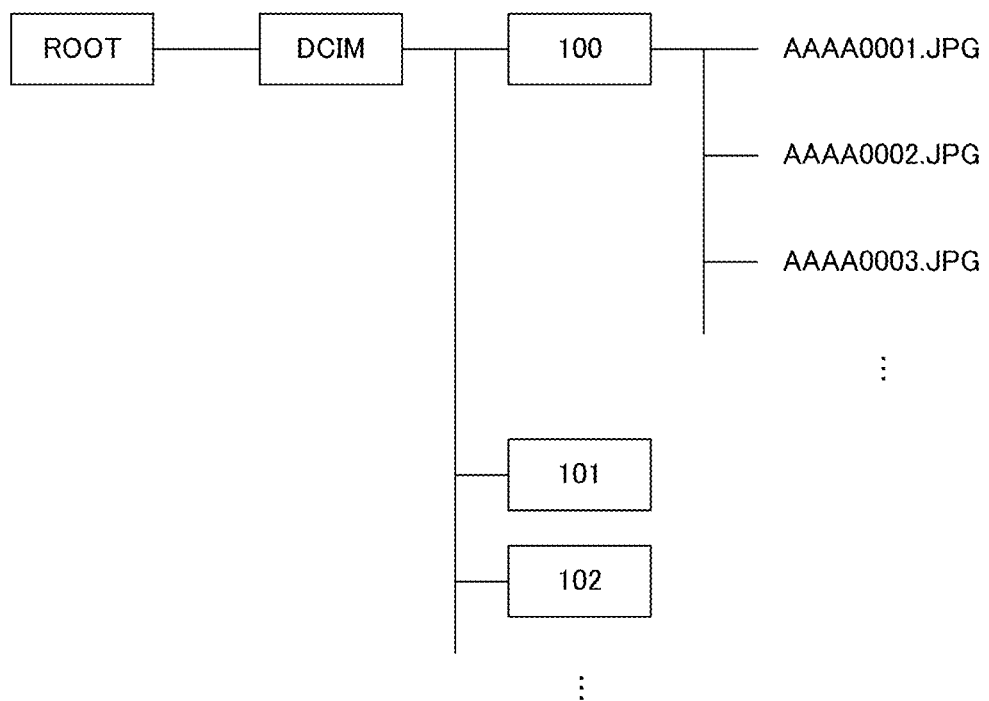
FIG. 3 is an illustrative view showing one example of a management state of an image file in a recording medium.

In the recording medium 36, the image file is managed under a tree-type folder structure shown in FIG. 3. A folder name consisting of three digit numbers indicating any one of "100" to "999" is allocated to an image folder which stores the image file. Moreover, all of the image folders are created under an image root folder (folder name="DCIM") located directly under a root folder.

Figure 4:
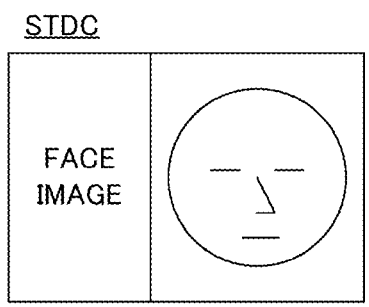
FIG. 4 is an illustrative view showing one example of a configuration of a standard face dictionary applied to the embodiment in FIG. 2.

Moreover, in the recording medium 36, an individual image folder for each person is created, and at every time the scene image including a face image of the person is recorded, the image file is stored in an individual image folder corresponding to the person. When a plurality of face images are included in the scene image, a plurality of image files containing a common scene image and a plurality of individual image folders respectively corresponding to a plurality of face images are created so as to respectively store the plurality of image files into the plurality of individual image folders. In order to realize such a function, under the imaging task, the CPU 30 searches for the face image of the person from the scene image represented by the image data for recording. For a searching process for the face image, a standard face dictionary STDC shown in FIG. 4, a thee-detection frame structure register RGST1 shown in FIG. 5 and a plurality of face-detection frame structures FD, FD, FD, . . . shown in FIG. 6 are prepared.

The face-detection frame structure FD is moved in a raster scanning manner on the scene image of the image data for recording (see FIG. 7). The size of the face-detection frame structure FD is reduced by a scale of "5" from "200" to "20" at every time the raster scanning is ended.

The CPU 30 reads out image data belonging to the face-detection frame structure FD from the image data for recording so as to compare with a face image registered in the standard face dictionary STDC. When a matching degree exceeds a reference value REF; it is regarded that the face image is discovered from the face-detection frame structure FD, and a variable CNT is incremented. Furthermore, the CPU 30 registers on the face-detection frame structure register RGST1 a position and a size of the face-detection frame structure FD at a current time point. Concurrently, each of face-detection frame structure numbers consisting of sequence numbers "1", "2", "3", . . . is registered on the face-detection frame structure register RGST1 in order of the face image being discovered.

Figures 8, 9, 10:
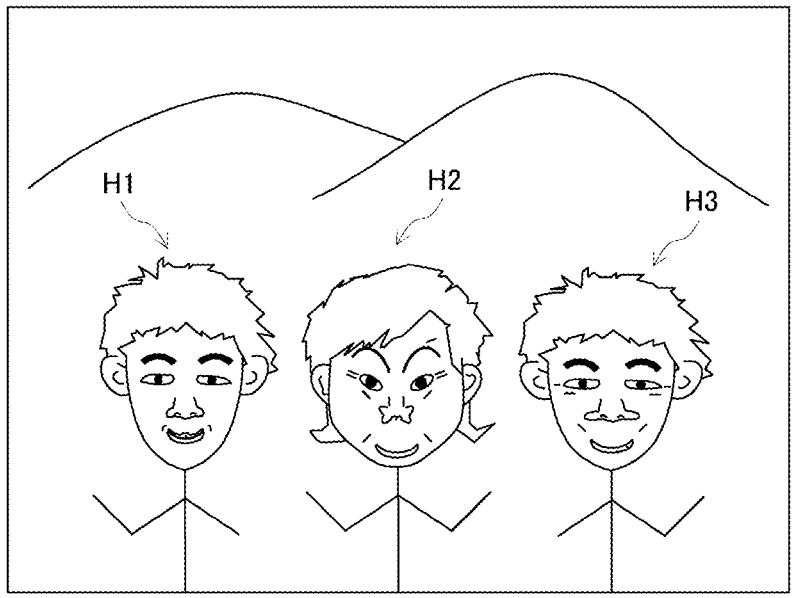
FIG. 8 is an illustrative view showing one example of a scene image stored in the recording medium.
FIG. 9 is an illustrative view showing one example of a configuration of a comparing register applied to the embodiment in FIG. 2.
FIG. 10 is an illustrative view showing one example of a configuration of a creating register applied to the embodiment in FIG. 2.

Thus, when the scene image shown in FIG. 8 is recorded, face images of persons H1, H2 and H3 are detected so as to register a position and a size of the face-detection frame structure FD surrounding the detected face image, on the face-detection frame structure register RGST1. Moreover, a position and a size of the face-detection frame structure FD corresponding to the person H1 is described in a column of the face-detection frame structure number "1", a position and a size of the face-detection frame structure FD corresponding to the person H2 is described in a column of the face-detection frame structure number "2", and a position and a size of the face-detection frame structure FD corresponding to the person H3 is described in a column of the face-detection frame structure number "3". At a time point at which a description corresponding to the person H3 is performed, the variable CNT indicates "3".

Subsequently, the CPU 30 designates the CNT of face-detection frame structures registered in the face-detection frame structure register RGST1 in order. Image data belonging to the designated face-detection frame structure is subjected to a following folder comparing process. In a case where no individual image folder is created, such as when the scene image including the face image of the person is recorded for the first time, as a result of the folder comparing process, nothing is registered on a comparing register RGST2 shown in FIG. 9. In this case, the face-detection frame structure number corresponding to the designated face-detection frame structure is registered on a creation register RGST3 shown in FIG. 10.

Again, the CPU 30 designates the CNT of face-detection frame structures registered in the face-detection frame structure register RGST1 in order so as to execute a folder storing process. In the folder storing process, when the face-detection frame structure number corresponding to the designated face-detection frame structure is registered in the creation register RGST3, the CPU 30 newly creates the individual image folder. In the created individual image folder, the image file including the image data for recording is stored.

Figure 11:
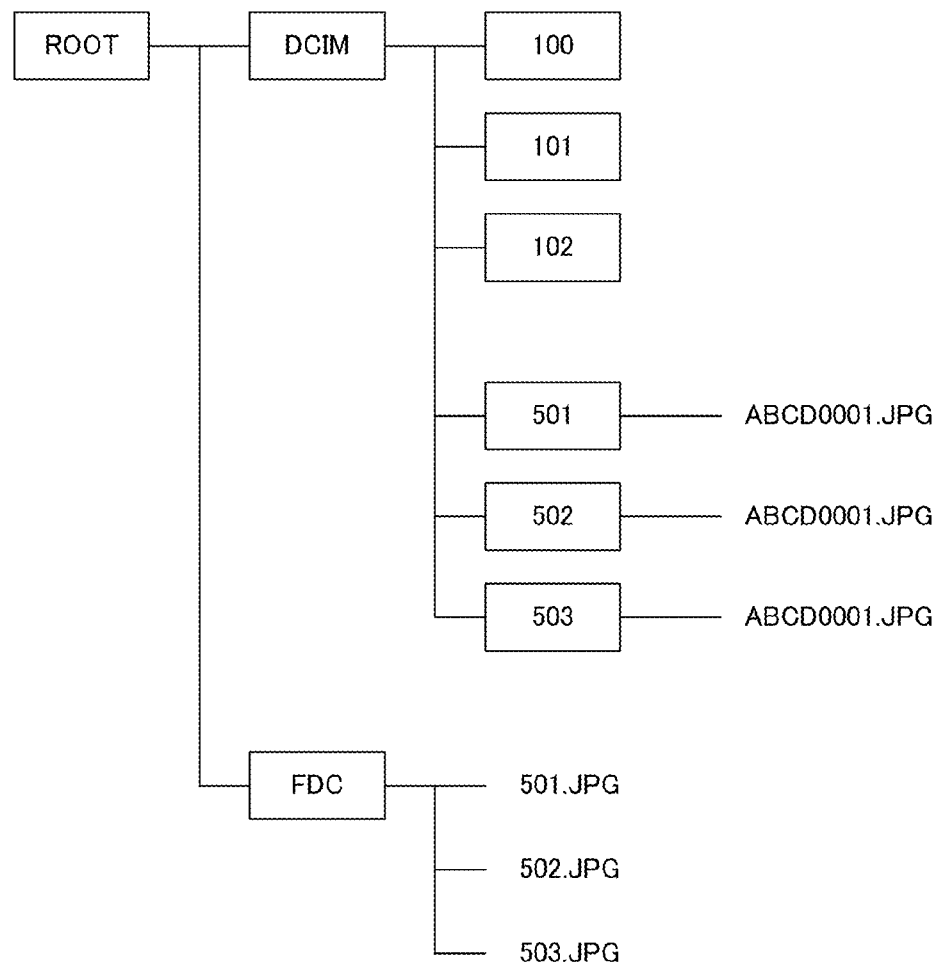
FIG. 11 is an illustrative view showing another example of the management state of the image file in the recording medium.

Thus, according to an example shown in FIG. 8, three face-detection frame structures registered in the face-detection frame structure register RGST1 are designated in order so as to register the face-detection frame structure numbers "1", "2" and "3" on the creation register RGST3. Since all of three face-detection frame structure numbers registered in the face-detection frame structure register RGST1 are also registered on the creation register RGST3, as shown in FIG. 11, three individual image folders are newly created under the image root folder so as to store the image file in each folder. According to an example of FIG. 11, out of the folder names "100" to "999" the folder names "501" to "999" are allocated to the individual image folders in order of the folder being created.

Moreover, the CPU 30 stores an image file including the image data belonging to the designated face-detection frame structure (hereafter, referred to as "face image file") in a face dictionary folder (folder name="FDC") located directly under the root folder. As a file name of the face image tile, the same name as the folder name of the created individual image folder is allocated. The face image file stored in the face dictionary folder is used for creating a face dictionary for folder-comparing FFDC shown in FIG. 14 and FIG. 21.

Figure 12:
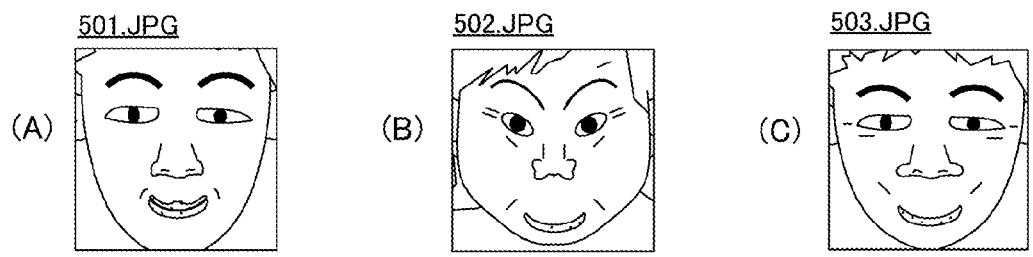
FIG. 12 is an illustrative view showing one example of an image file stored in a face dictionary folder.

According to the example of FIG. 8, corresponding to the person H1, an individual image folder "501" is created so as to store a face image file "501.JPG" shown in FIG. 12(A) in the face dictionary folder. Corresponding to the person H2, an individual image folder "502" is created so as to store a face image file "502.JPG" shown in FIG. 12(B) in the face dictionary folder. Corresponding to the person H3, an individual image folder "503" is created so as to store a face image file "503.JPG" shown in FIG. 12(C) in the face dictionary folder.

Figures 13, 14, 15:
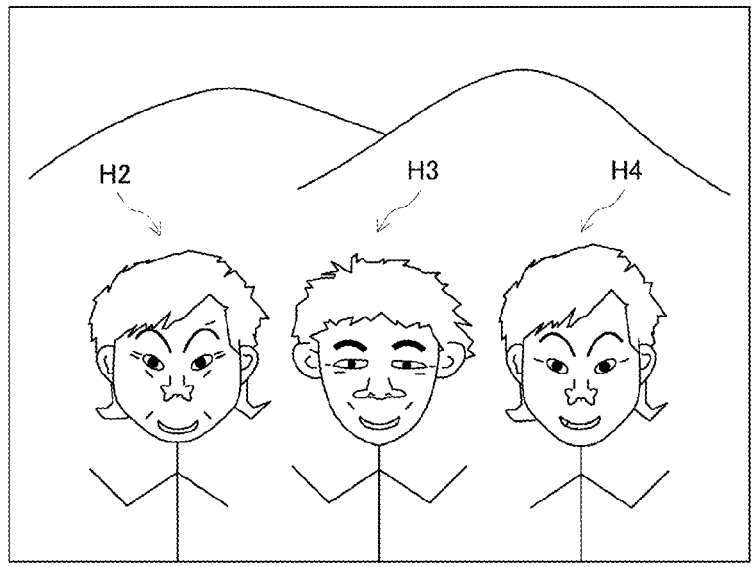
FIG. 13 is an illustrative view showing another example of the scene image stored in the recording medium.
FIG. 14 is an illustrative view showing one example of a configuration of a face dictionary for folder-comparing FFDC applied to the embodiment in FIG. 2.
FIG. 15 is an illustrative view showing one example of a configuration of a storage register applied to the embodiment in FIG. 2.

When the scene image shown in FIG. 13 is recorded, the face image of the persons H2, H3 and H4 are detected so as to register a position and a size of the face-detection frame structure FD surrounding the detected face image on the face-detection frame structure register RGST1. Moreover, the position and size of the face-detection frame structure FD corresponding to the person H2 is described in the column of the face-detection frame structure number "1", the position and size of the face-detection frame structure FD corresponding to the person H3 is described in the column of the face-detection frame structure number "2", and the position and size of the face-detection frame structure FD corresponding to the person H4 is described in the column of the face-detection frame structure number "3". At a time point at which a description corresponding to the person H4 is performed, the variable CNT indicates "3".

When the scene image shown in FIG. 13 is recorded following the scene image shown in FIG. 8, for example, in a case where an operator of the digital camera 10 is the person H4 in the example of FIG. 8 while the operator is changed to the person H1 in an example of FIG. 13, the face images of the persons H2 and H3 are included in both scene images of FIG. 8 and FIG. 13. Moreover, when the scene image shown in FIG. 13 is recorded, the individual image folder corresponding to each of the persons H2 and H3 is already created so as to store the image file as shown in FIG. 11.

Thus, when the individual image folder already exists, the CPU 30 designates the CNT of face-detection frame structures registered in the face-detection frame structure register RGST1 in order and performs the folder comparing process on the image data belonging to the designated face-detection frame structure.

For the folder comparing process, the comparing register RGST2 shown in FIG. 9 is prepared. Moreover, the face dictionary for folder-comparing FFDC shown in FIG. 14 is created by using the face image file stored in the face dictionary folder. In the face dictionary for folder-comparing FFDC, image data included in the face image file (hereafter, referred to as "dictionary image data") is contained for each file name, i.e., folder name of the individual image folder.

In the folder comparing process, a variable S is set to each of "501" to "Smax", and the image data belonging to the designated face-detection frame structure is compared with dictionary image data corresponding to a folder name coincident with the variable S in the face dictionary for folder-comparing FFDC. It is noted that "Smax" is equivalent to the total number of the dictionary image data contained in the face dictionary for folder-comparing FFDC, i.e., a number which is added 500 to the total number of the face image files stored in the face dictionary folder. When a matching degree exceeds a reference value REF2, the folder name (=variable S) corresponding to the dictionary image data in a matching destination and the matching degree are registered on the comparing register RGST2 shown in FIG. 9.

When at least one folder name is registered in the comparing register RGST2 after completion of the folder comparing process, a face-detection frame structure number corresponding to the designated face-frame structure, a folder name corresponding to a maximum matching degree and the matching degree are registered on a storage register RGST4 shown in FIG. 15. When nothing is registered in the comparing register RGST2, the face-detection frame structure number corresponding to the designated face-detection frame structure is registered on the creation register RGST3 shown in FIG. 10.

According to the example shown in FIG. 13, when the folder comparing process is performed on image data belonging to the face-detection frame structure of the person H2, dictionary image data corresponding to the folder name "502" represents the face of the person H2. When the variable S indicates "502", the matching degree exceeds the reference value REF2 while the matching degree with another dictionary image data does not exceeds the reference value REF2, and therefore, the folder name "502" and the matching degree are registered on the comparing register RGST2. Moreover, in the first column of the storage register RGST4, the face-detection frame structure number "1", the folder name "502" and the matching degree are registered.

Figures 16, 17:
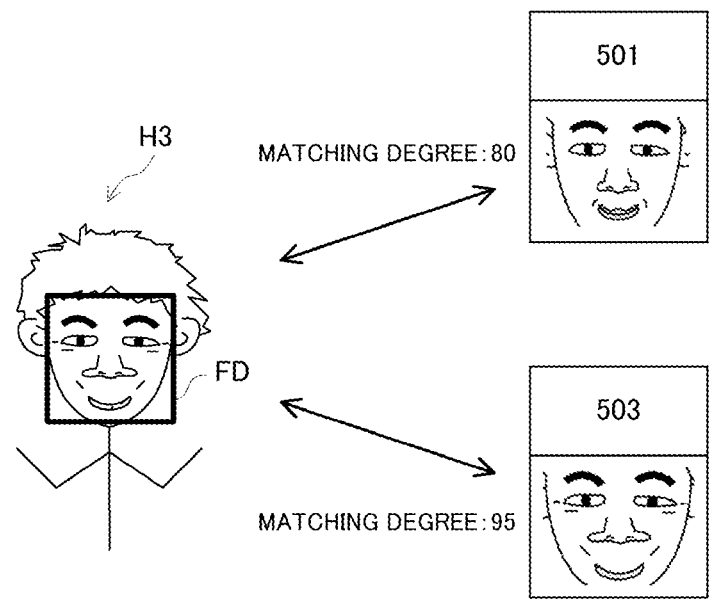
FIG. 16 is an illustrative view showing one example of a folder comparing process in the imaging task.
FIG. 17 is an illustrative view showing one example of a usage state of the comparing register applied to the embodiment in FIG. 2.

Subsequently, when the folder comparing process is performed on image data belonging to the face-detection frame structure of the person H3, the matching degree exceeds the reference value REF2 when the variable S indicates "503" (=the folder name of dictionary image data representing the face of the person H3). However, for example, in a case where the faces of the persons H3 and H1 resemble each other because they are parent and child, as shown in FIG. 16, there is a possibility that the matching degree exceeds the reference value REF2 when the variable S indicates "501". At this time, the folder names "501" and "503" and each matching degree are registered on the comparing register RGST2 (see FIG. 17). In this case, the matching degree with the dictionary image data equivalent to the folder name "503" representing the face image of the person himself indicates the maximum value, and therefore, the face-detection frame structure number "2", the folder name "503" and the matching degree are registered on the second column of the storage register RGST4.

As a result of the folder comparing process, when there is any registration in the storage register RGST4, it is indicated that the individual image folder corresponding to any one of the face images included in the recorded scene image is already created. In this case, the CPU 30 sets a variable Q to each of "1" to "Qmax−1" and designates a Q-th column of the storage register RGST4 as a reference column so as to perform a folder duplication avoiding process on a face-detection frame structure number registered in the reference column. It is noted that "Qmax" is the total number of the face-detection frame structure numbers registered in the storage register RGST4.

In the folder duplication avoiding process, a variable T is set to each of "Q+1" to "Qmax", and a folder name registered in the reference column is compared with a folder name registered in a T-th column. When the folder names are coincident, a matching degree registered in the reference column is compared with a matching degree registered in the T-th column. When the matching degree registered in the reference column is coincident with or exceeds the matching degree registered in the T-th column, the face-detection frame structure number registered in the T-th column is registered on the creation register RGST3. Otherwise, the face-detection frame structure number registered in the reference column is registered on the creation register RGST3 so as to complete the folder duplication avoiding process for the reference column.

Figures 18, 19:
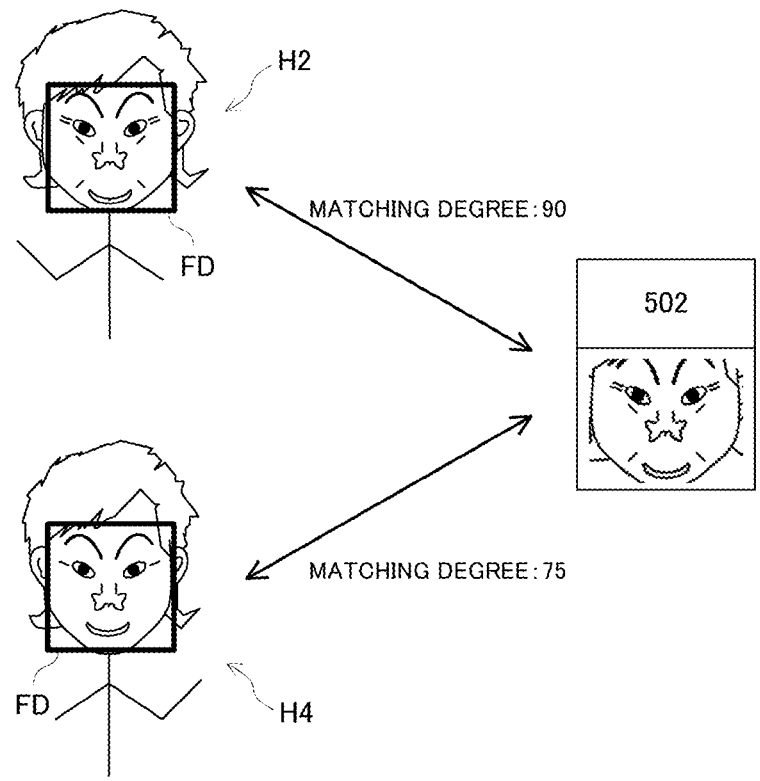
FIG. 18 is an illustrative view showing one example of a folder duplication avoiding process in the imaging task.
FIG. 19 is an illustrative view showing one example of a usage state of the storage register applied to the embodiment in FIG. 2.

In the example shown in FIG. 13, when the folder comparing process is performed on image data belonging to the face-detection frame structure of the person H4, dictionary image data corresponding to the person H4 is not contained in the face dictionary for folder-comparing FFDC. Therefore, nothing is registered on the comparing register RGST2, and the face-detection frame structure number "3" is registered on the creation register RGST3. However, for example, in the folder comparing process for the face of the person H4, in a case where the faces of the persons H4 and H2 resemble each other because they are parent and child, as shown in FIG. 18, there is a possibility that the matching degree exceeds the reference value REF2 when the variable S indicates "502". At this time, the folder name "502" and the matching degree are registered on the comparing register RGST2. Then, the face-detection frame structure number "3", the folder name "502" and the matching degree are registered on the third column of the storage register RGST4.

As a result, in the storage register RGST4, the folder name registered in the first column (corresponding to the person H2) is coincident with the folder name registered in the third column (corresponding to the person H4) by both of them indicating "502" (see FIG. 19). Then, the matching degree registered in each column is compared. In this case, the face image file "502.JPG" which is a matching destination of the matching degree to be compared is the face image of the person H2, and therefore, the matching degree registered in the first column exceeds the matching degree registered in the third column. Therefore, the face-detection frame structure number "3" registered in the third column is registered on the creation register RGST3.

It is noted that, in the storage register RGST4, when only one face-detection frame structure number is registered or nothing is registered, the folder duplication avoiding process is not executed.

Subsequently, the CPU 30 executes the folder storing process. In the folder storing process, when the face-detection frame structure number corresponding to the designated face-detection frame structure is not registered in the creation register RGST3, the CPU 30 refers to a folder name corresponding to the face-detection frame structure number in the storage register RGST4. In an individual image folder indicated by the referred folder name, the image file including the image data for recording is stored.

Figure 20:
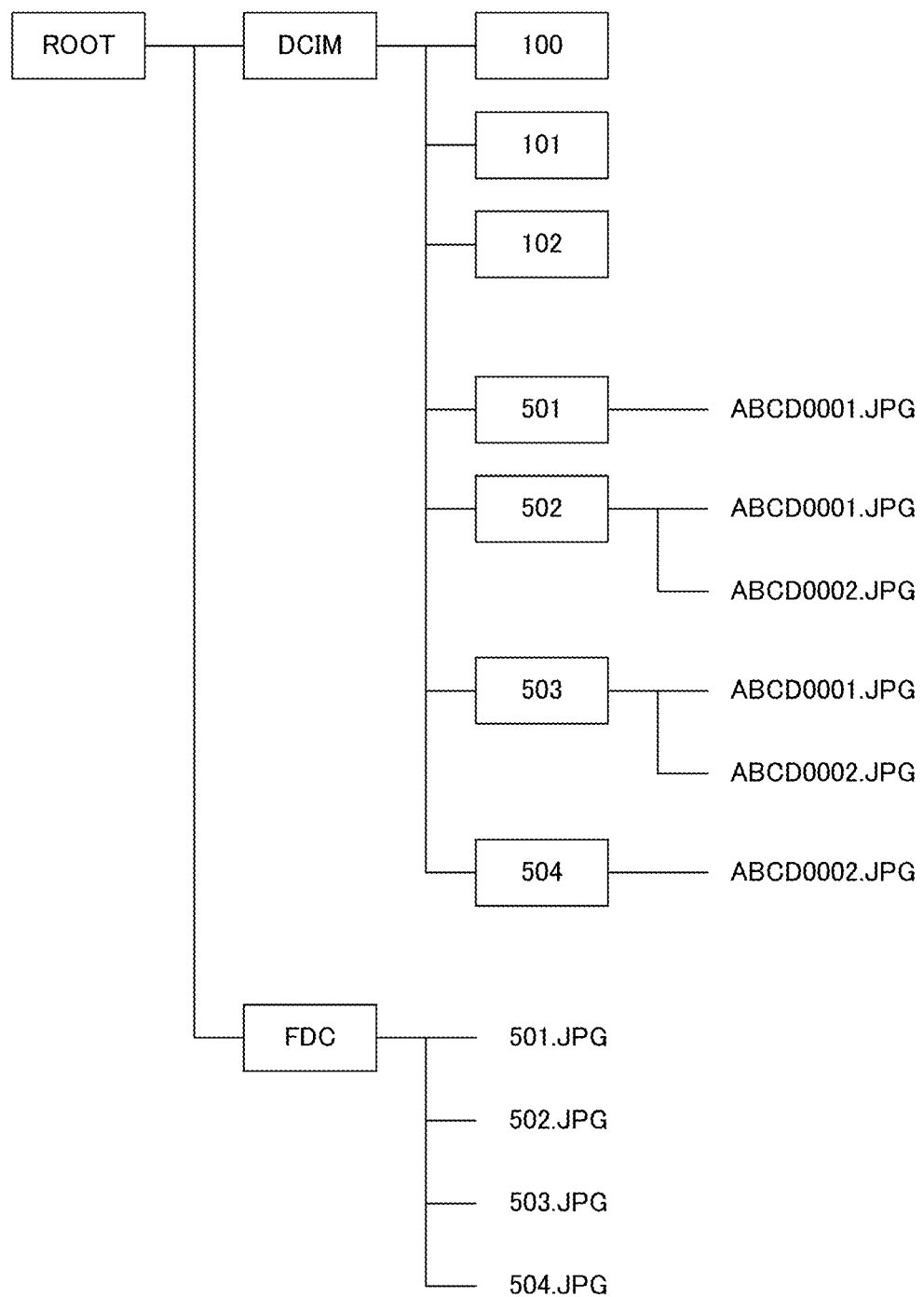
FIG. 20 is an illustrative view showing still another example of the management state of the image file in the recording medium.

When the scene image shown in FIG. 13 is recorded following the scene image shown in FIG. 8, the face-detection frame structure number "3" is registered on the creation register RGST3, and therefore, as shown in FIG. 20, an individual image folder "504" is newly created under the image root folder. In the created individual image folder "504", the image file is stored.

Figure 21:
FIG. 21 is an illustrative view showing another example of the configuration of the face dictionary for folder-comparing FFDC applied to the embodiment in FIG. 2.
Figure 21:
Figure 21:
Figure 21:

Moreover, as shown in FIG. 20, a face image file "504.JPG" including the image data belonging to the designated face-detection frame structure is stored in the face dictionary folder. As a result, the face dictionary for folder-comparing FFDC used when the folder comparing process is executed next time is configured as shown in FIG. 21.

Moreover, the folder names corresponding to the face-detection frame structure numbers "1" and "2" not registered in the creation register RGST3 are referred to in the storage register RGST4. The folder names "502" and "503" are respectively corresponding to the face-detection frame structure numbers "1" and "2", and therefore, as shown in FIG. 20, the image files are respectively stored also in the individual image folders "502" and "503".

Figure 22:
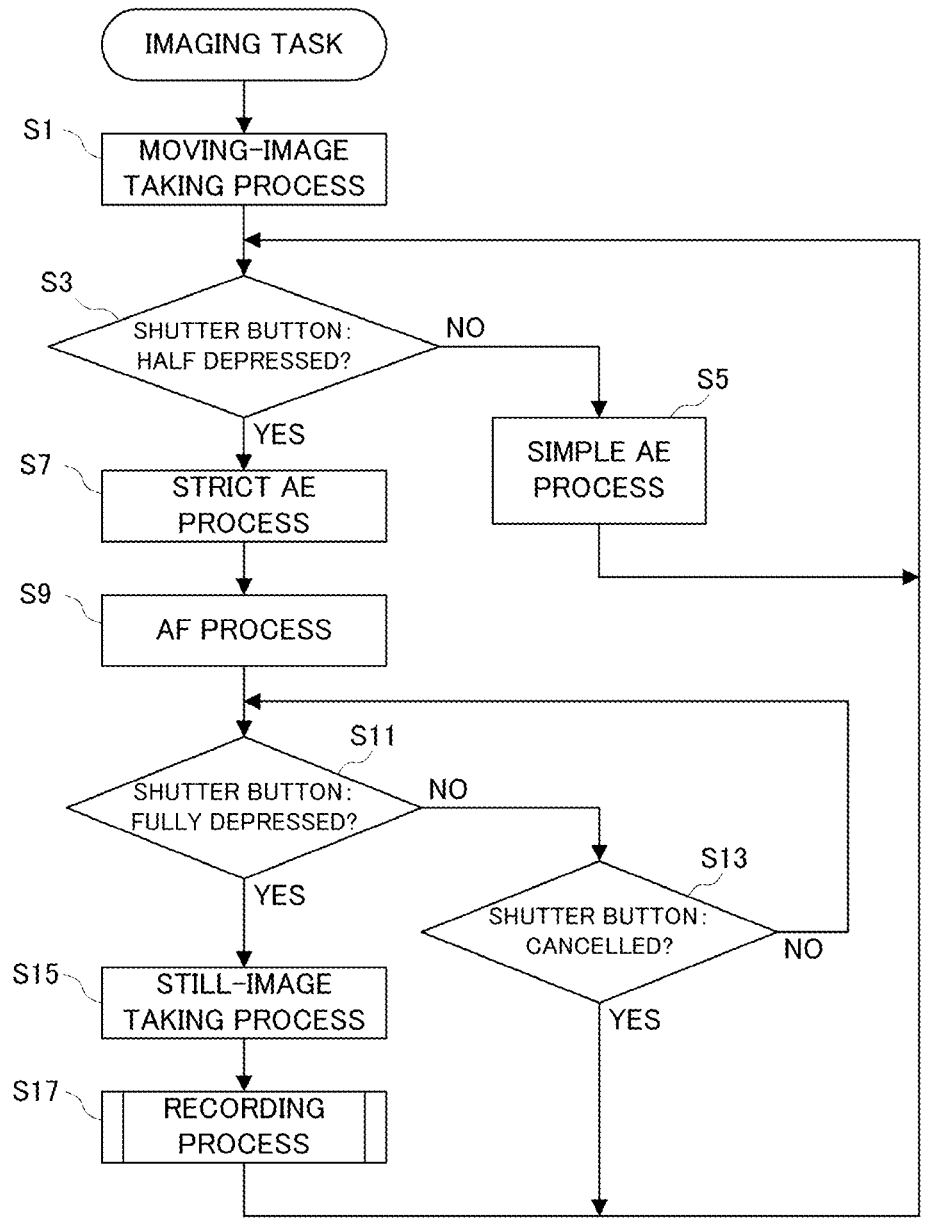
FIG. 22 is a flowchart showing one portion of behavior of a CPU applied to the embodiment in FIG. 2.
Figure 23:
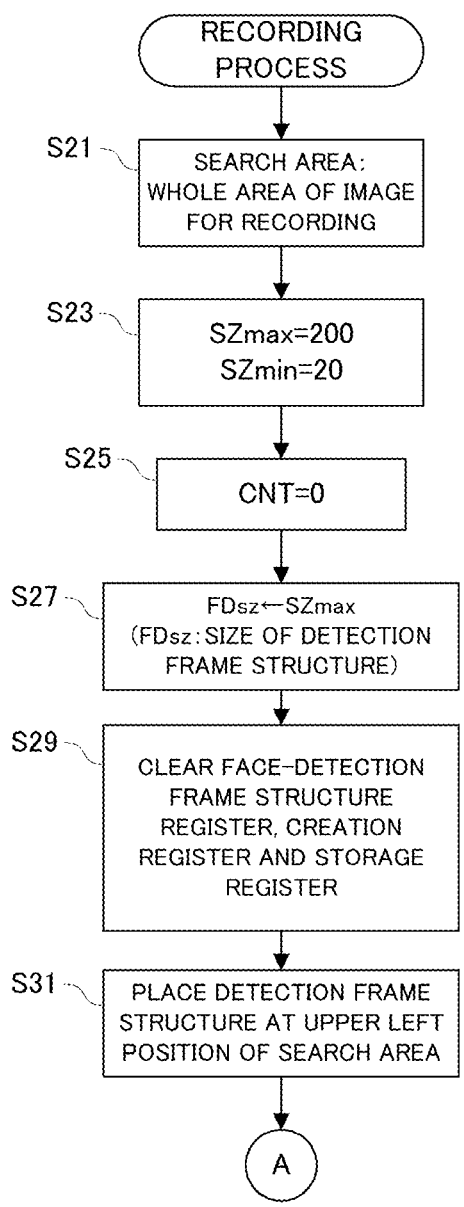
FIG. 23 is a flowchart showing another portion of the behavior of the CPU applied to the embodiment in FIG. 2.
Figure 24:
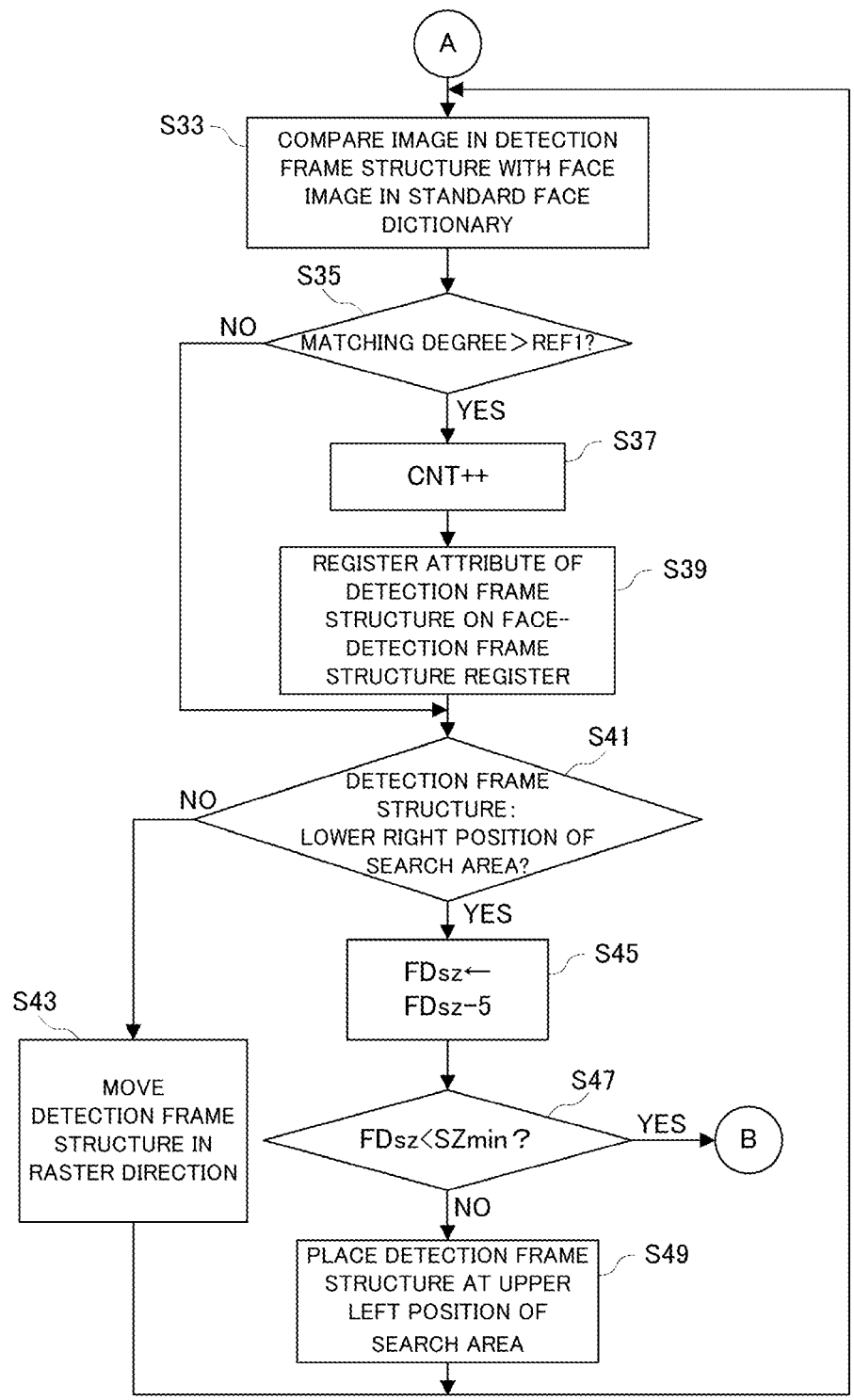
FIG. 24 is a flowchart showing still another portion of the behavior of the CPU applied to the embodiment in FIG. 2.

The CPU 30 of the digital camera 10 executes a plurality of tasks including the imaging task shown in FIG. 22. It is noted that, control programs corresponding to these tasks are stored in a flash memory 40.

With reference to FIG. 22, in a step S1, the moving-image taking process is executed. As a result, a live view image representing the scene is displayed on the LCD monitor 28. In a step S3, it is determined whether or not the shutter button 32sh is half depressed. When a determined result is NO, in a step S5, the simple AE process is repeatedly executed. The brightness of the live view image is adjusted approximately by the simple AE process.

When the determined result of the step S3 is updated from NO to YES, in a step S7, the strict AE process is executed, and in a step S9, the AF process is executed. The brightness of the live view image is adjusted to an optimal value by the strict AE process, and the focus lens 12 is placed at the focal point by the AF process.

Upon completion of the AF process, in a step S11, it is determined whether or not the shutter button 32sh is fully depressed, and as long as a determined result is NO, in a step S13, it is determined whether or not an operation of the shutter button 32sh is cancelled. When a determined result of the step S13 is updated from NO to YES, the process returns to the step S3 while when the determined result of the step S11 is updated from NO to YES, the process advances to a step S15.

In the step S15, a still-image taking process is executed, and as a result, one frame of the image data representing the scene at the time point at which the shutter button 32sh is fully depressed is taken into the SDRAM 24. In a step S17, the recording process is executed, and upon completion of the recording process, the process returns to the step S3.

The recording process in the step S17 shown in FIG. 22 is executed according to a subroutine shown in FIG. 23 to FIG. 26. In a step S21, a whole area of the scene image represented by the image data for recording is set as a search area. In a step S23, in order to define a variable range of the size of the face-detection frame structure FD, a maximum size SZmax is set to "200", and a minimum size SZmin is set to "20". Upon completion of defining the variable range, in a step S25, the variable CNT is set to "0", and in a step S27, the size of the face-detection frame structure FD is set to "SZmax".

In a step S29, the face-detection frame structure register RGST1, the creation register RGST3 and the storage register RGST4 are cleared, and in a step S31, the face-detection frame structure FD is placed at an upper left position of the search area. In a step S33, partial image data for recording belonging to the face-detection frame structure FD is compared with the face image contained in the standard face dictionary STDC, and in a step S35, it is determined whether or not the matching degree exceeds the reference value REF1. When a determined result is NO, the process directly advances to a step S41 while when the determined result is YES, the process advances to the step S41 via steps S37 and S39. In the step S37, the variable CNT is incremented. In the step S39, the position and size of the face-detection frame structure FD at the current time point are registered on the face-detection frame structure register RGST1. Concurrently, each of the face-detection frame structure numbers consisting of the sequence numbers "1", "2", "3", ... is registered on the face-detection frame structure register RGST1 in order of the face image being discovered. In the step S41, it is determined whether or not the face-detection frame structure FD reaches a lower right position of the search area. When a determined result is NO, in a step S43, the face-detection frame structure FD is moved by a predetermined amount in a raster direction, and thereafter, the process returns to the step S33. When the determined result is YES, in a step S45, the size of the face-detection frame structure ED is reduced by a scale of "5", and in a step S47, it is determined whether or not the size of the face-detection frame structure FD is less than "SZmin". When a determined result of the step S47 is NO, in a step S49, the face-detection frame structure FD is placed at the upper left position of the search area, and thereafter, the process returns to the step S33. When the determined result of the step S47 is YES, the process advances to a step S51.

In the step S51, a variable P is set to "1", and in a step S53, it is determined whether or not the variable P exceeds the variable CNT. When a determined result is NO, the process advances to a step S55 so as to clear the comparing register RGST2. In a step S57, the face-detection frame structure set in a P-th column of the face-detection frame structure register RGST1 is designated. In a step S59, the folder comparing process is executed taking notice of the image data belonging to the designated face-detection frame structure. Upon completion of the folder comparing process, in a step S61, it is determined whether or not there is any registration in the comparing register RGST2. When a determined result is NO, the process advances to a step S63 while when the determined result is YES, the process advances to a step S64.

In the step S63, the face-detection frame structure number (=P) corresponding to the designated face-detection frame structure is registered in the creation register RGST3. On the other hand, in the step S64, the folder name corresponding to the maximum matching degree is selected in the comparing register RGST2. In a step S65, the face-detection frame structure number (=P) corresponding to the designated face-detection frame structure, the selected folder name and the matching degree are registered on the storage register RGST4. Upon completion of the process in the step S63 or S65, in a step S67, the variable P is incremented, and thereafter, the process returns to the step S53.

When the determined result of the step S53 is YES, in a step S69, it is determined whether or not there is any registration in the storage register RGST4. When a determined result of the step S69 is NO, the process advances to a step S83 while when YES is determined, in a step S71, the variable Q is set to "1". In a step S73, it is determined whether or not the variable Q is equal to or more than "Qmax", and when a determined result is NO, in a step S75, the Q-th column of the storage register RGST4 is designated as the reference column. It is noted that "Qmax" is the total number of the face-detection frame structure numbers registered in the storage register RGST4.

In a step S77, it is determined whether or not the face-detection frame structure number described in the reference column is registered in the creation register RGST3. When a determined result is YES, the process advances to a step S81 while when the determined result is NO, the folder duplication avoiding process is executed in a step S79. In the step S81, the variable Q is incremented, and thereafter, the process returns to the step S73.

When the determined result of the step S73 is YES, in a step S83, a variable R is set to "1". In a step S85, it is determined whether or not the variable R exceeds the variable CNT. When the determined result is NO, in a step S87, the face-detection frame structure set in an R-th column of the face-detection frame structure register RGST1 is designated, and in a step S89, the folder storing process taking notice of the face-detection frame structure number corresponding to the designated face-detection frame structure is executed. In a step S91, the variable R is incremented, and thereafter, the process returns to the step S85. When the determined result of the step S85 is YES, the process returns to the routine in an upper hierarchy.

Figure 25:
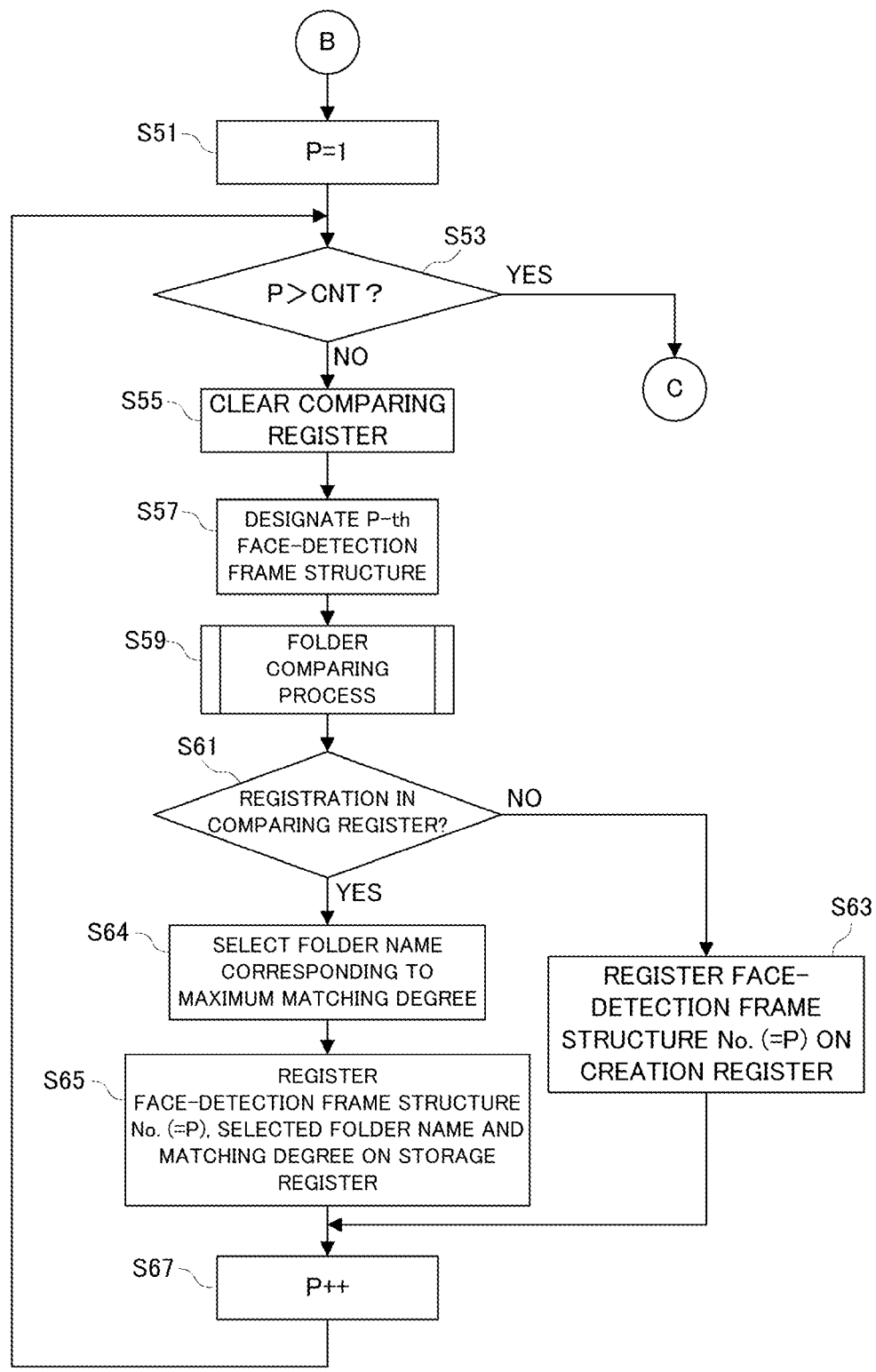
FIG. 25 is a flowchart showing yet another portion of the behavior of the CPU applied to the embodiment in FIG. 2.
Figure 27:
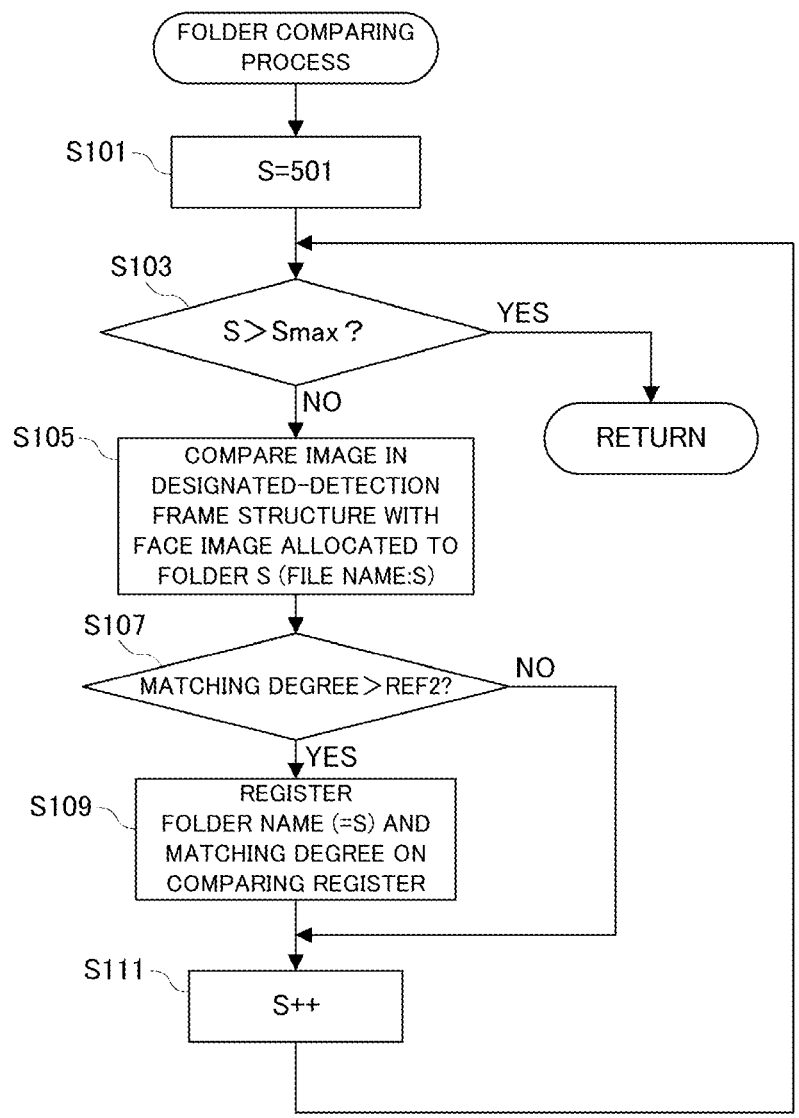
FIG. 27 is a flowchart showing still another portion of the behavior of the CPU applied to the embodiment in FIG. 2.

The folder comparing process in the step S59 shown in FIG. 25 is executed according to a subroutine shown in FIG. 27. In a step S101, the variable S is set to "501", and in a step S103, it is determined whether or not the variable S exceeds "Smax". When the determined result is NO, in a step S105, the image data belonging to the designated face-detection frame structure is compared with the dictionary image data described in a column of a folder name "S" of the face dictionary for folder-comparing FFDC. It is noted that "Smax" is equivalent to the total number of the dictionary image data contained in the face dictionary for folder-comparing FFDC, i.e., the number which is added 500 to the total number of the face image files stored in the face dictionary folder.

In a step S107, it is determined whether or not the matching degree exceeds the reference value REF2, and when a determined result is NO, the process advances to a step S111 while when the determined result is YES, in a step S109, the folder name (=S) corresponding to the dictionary image data in the matching destination and the matching degree are registered on the comparing register RGST2. In the step S111, the variable S is incremented, and thereafter, the process returns to the step S103. When the determined result of the step S103 is YES, the process returns to the routine in an upper hierarchy.

Figure 26:
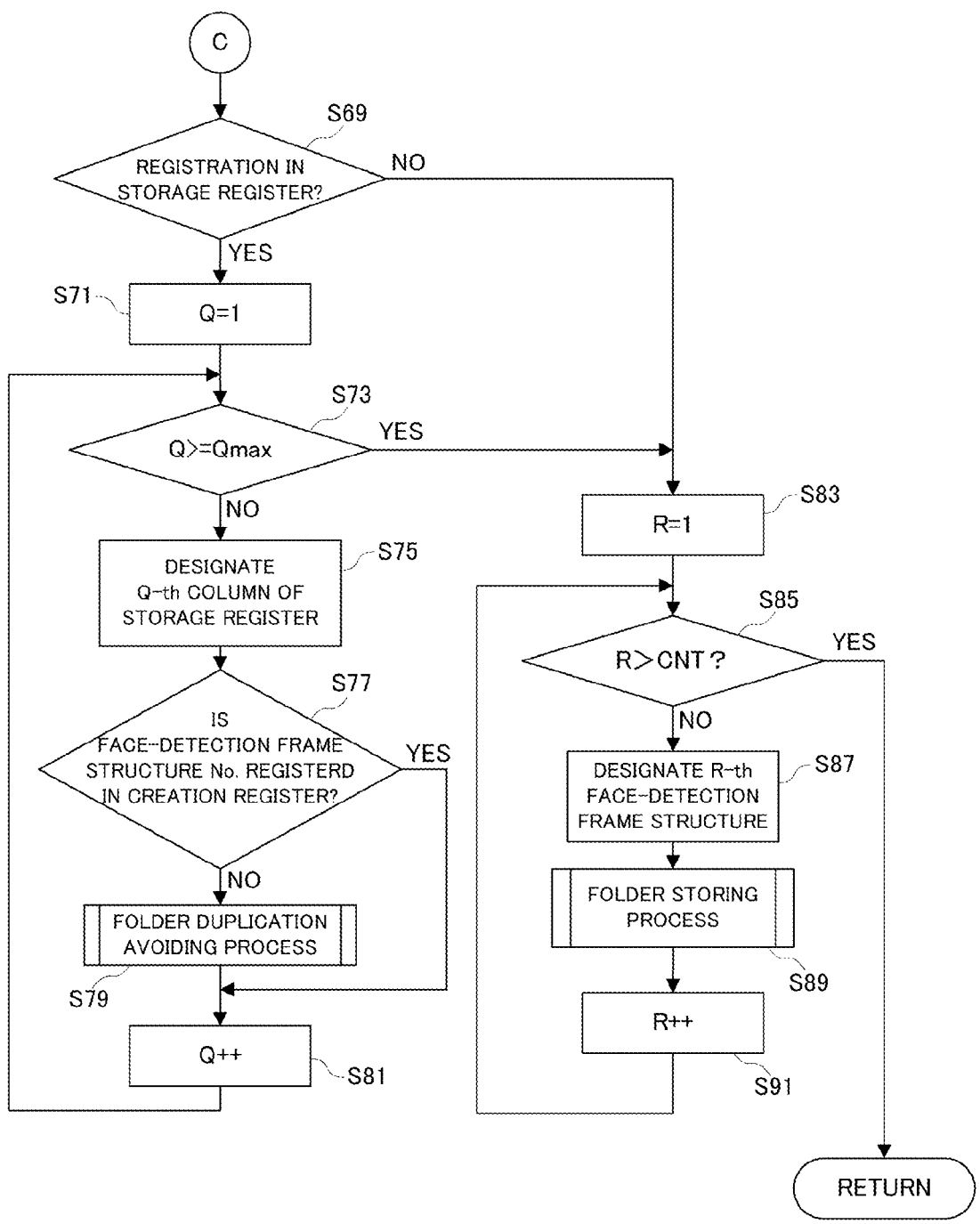
FIG. 26 is a flowchart showing another portion of the behavior of the CPU applied to the embodiment in FIG. 2.
Figure 28:
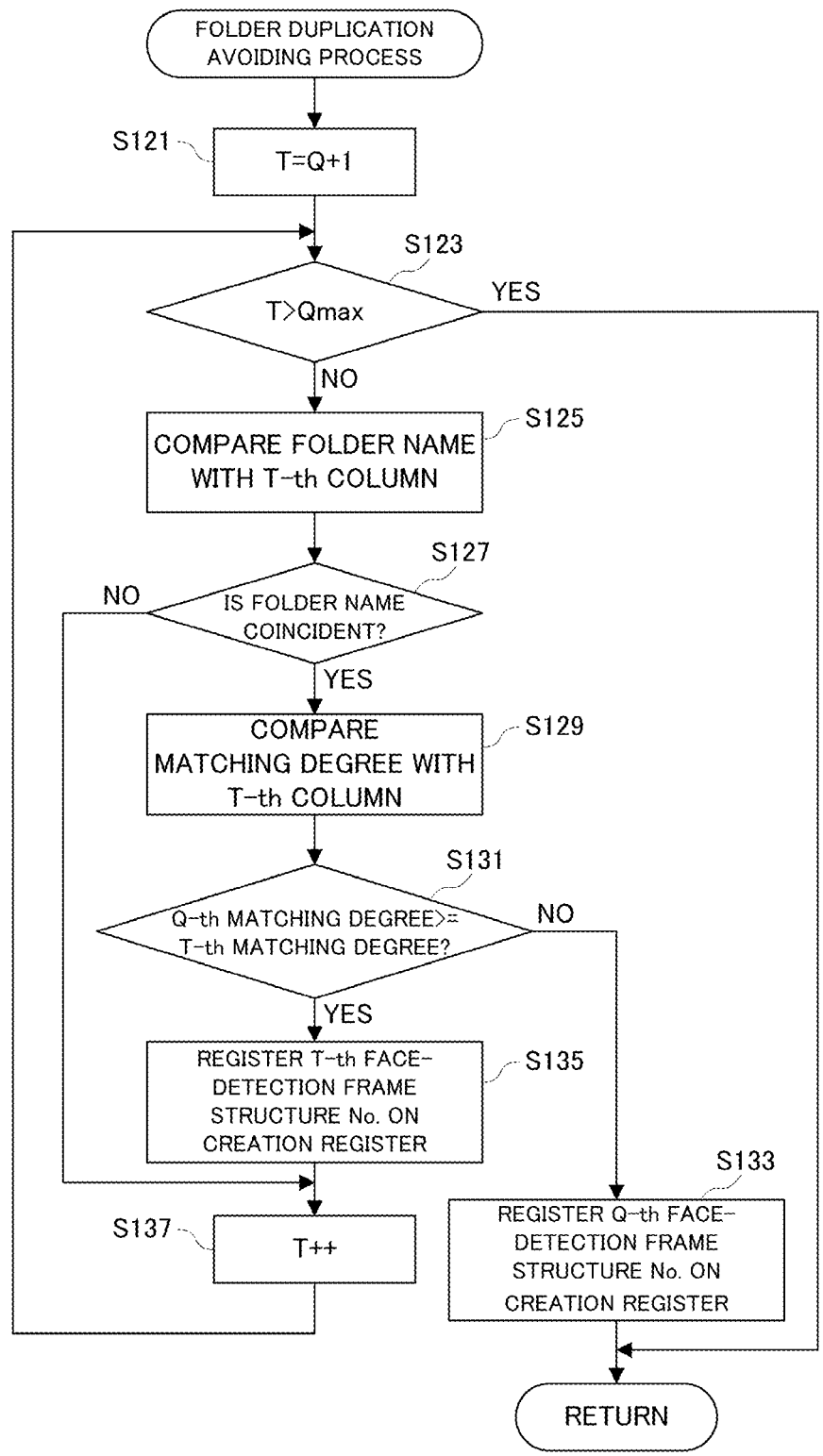
FIG. 28 is a flowchart showing yet another portion of the behavior of the CPU applied to the embodiment in FIG. 2.

The folder duplication avoiding process in the step S79 shown in FIG. 26 is executed according to a subroutine shown in FIG. 28. In a step S121, the variable T is set to "the variable Q+1", and in a step S123, it is determined whether or not the variable T exceeds "Qmax". When a determined result is NO, in a step S125, the folder names respectively described in the reference column and the T-th column of the storage register RGST4 are compared with each other. In a step S127, it is determined whether or not the folder names are coincident, and when a determined result is NO, the process advances to a step S137 while when the determined result is YES, in a step S129, the matching degrees respectively described in the reference column and the T-th column of the storage register RGST4 are compared with each other. In a step S131, it is determined whether or not the matching degree described in the reference column is equal to or exceeds the matching degree described in the T-th column.

When a determined result is NO, in a step S133, the face-detection frame structure number described in the reference column is registered on the creation register RGST3, and thereafter, the process returns to the routine in an upper hierarchy. When the determined result is YES, in a step S135, the face-detection frame structure number described in the T-th column is registered on the creation register RGST3. In the step S137, the variable T is incremented, and thereafter, the process returns to the step S123. When the determined result of the step S123 is YES, the process returns to the routine in an upper hierarchy.

Figure 29:
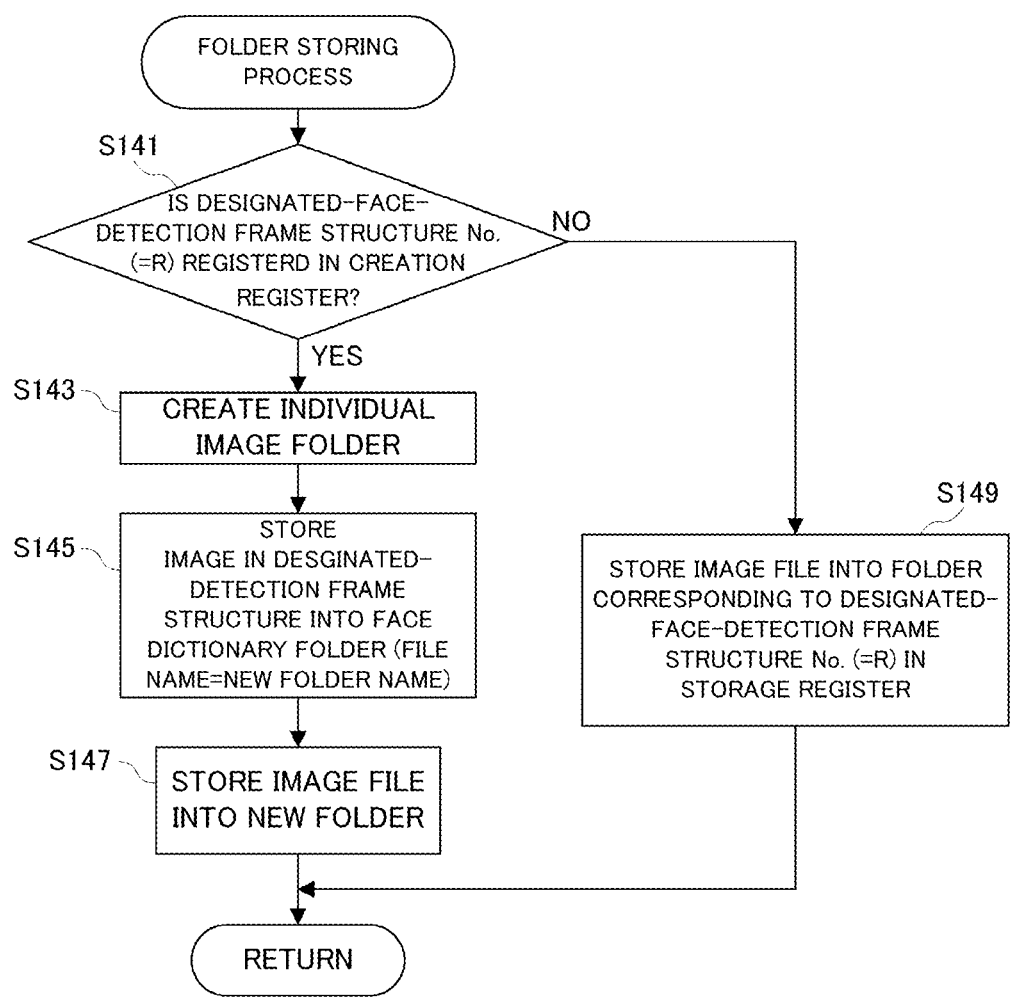
FIG. 29 is a flowchart showing another portion of the behavior of the CPU applied to the embodiment in FIG. 2.

The folder storing process in the step S89 shown in FIG. 26 is executed according to a subroutine shown in FIG. 29. In a step S141, it is determined whether or not the face-detection frame structure number (=R) corresponding to the designated face-detection frame structure is registered in the creation register RGST3. When a determined result is YES, in a step S143, the individual image folder is newly created. In a step S145, the image data belonging to the designated face-detection frame structure is stored in the face dictionary folder. As the file name, the same name as the folder name of the created individual image folder is allocated. The face image file thus stored in the face dictionary folder configures the face dictionary for folder-comparing FFDC. In a step S147, the image file including the image data for recording is stored in the created individual image folder.

When the determined result of the step S141 is NO, the process advances to a step S149. In the step S149, the folder name corresponding to the face-detection frame structure number (=R) corresponding to the designated face-detection frame structure is referred to in the storage register RGST4 so as to store the image file including the image data for recording in the individual image folder indicated by the referred folder name. Upon completion of the process in the step S147 or S149, the process returns to the routine in an upper hierarchy.

As can be seen from the above-described explanation, the CPU 30 designates each of one or at least two characteristic images included in the scene image as the reference characteristic image (S57) and searches for the specific folder in which the dictionary image adapted to the reference characteristic image is associated with, from among one or at least two folders in which one or at least two dictionary images are respectively associated with (S59, S64 to S65, S121 to S131, S137, S141). Moreover, the CPU 30 stores the noticed scene image into the discovered specific folder (S149), creates the folder in which the dictionary image equivalent to the reference characteristic image is associated with, corresponding to non-discovering the specific folder (S63, S143 to S145) and executes the process of storing the noticed scene image into the created folder, in association with the process of creating the folder (S63, S147).

Thus, the specific folder is equivalent to the folder in which the dictionary image adapted to the characteristic image included in the scene image is associated with. When the specific folder is discovered, the scene image is stored into the specific folder. On the other hand, when the specific folder is not discovered, another folder in which the dictionary image equivalent to the characteristic image included in the scene image is associated with is created so as to store the scene image. Thereby, it becomes possible to manage the scene image for each characteristic image.

Figure 30:
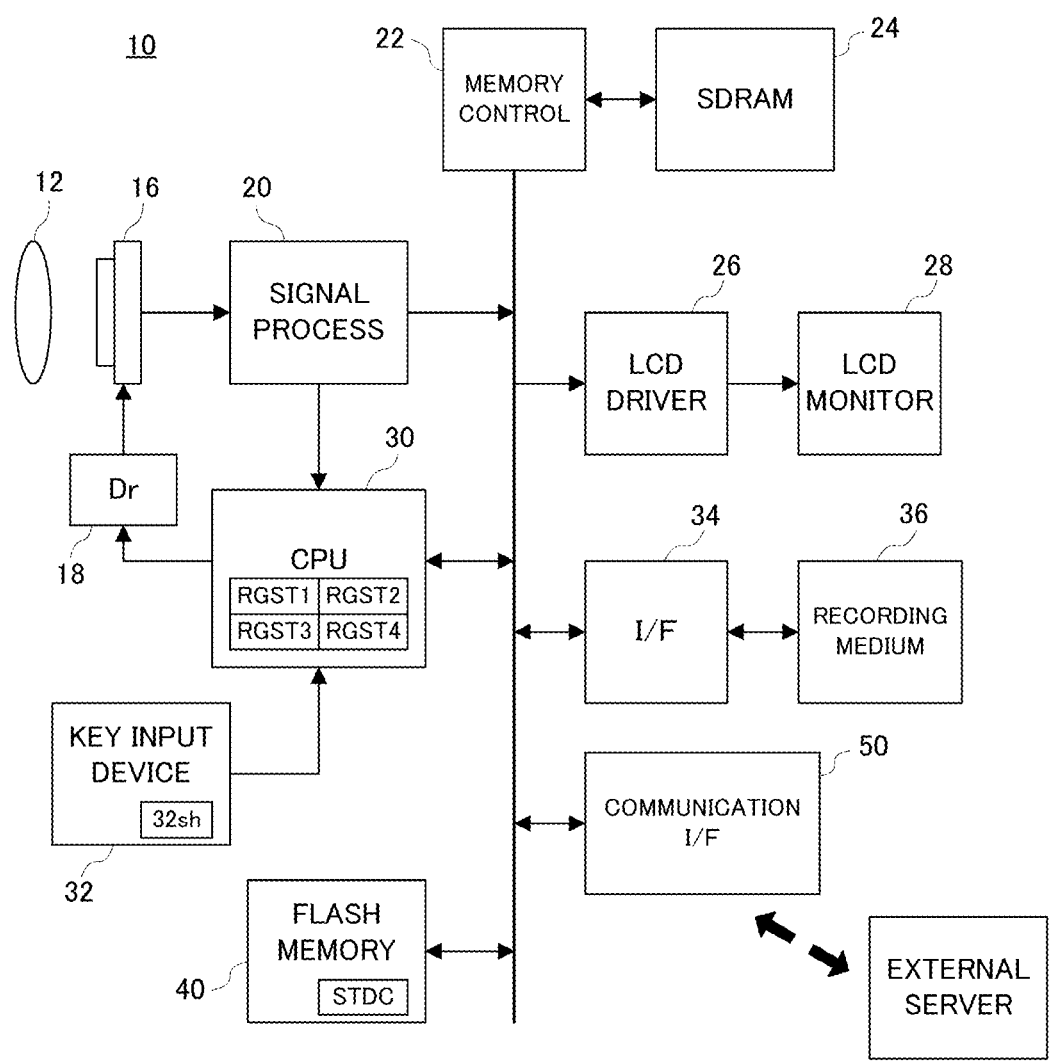
FIG. 30 is a block diagram showing a configuration of another embodiment of the present invention.

It is noted that, in this embodiment, the control programs equivalent to the multi task operating system and the plurality of tasks executed thereby are previously stored in the flash memory 40. However, a communication I/F 50 for connecting to the external server may be arranged in the digital camera 10 as shown in FIG. 30 so as to initially prepare a part of the control programs in the flash memory 40 as an internal control program while acquire another part of the control programs from the external server as an external control program. In this case, the above-described procedures are realized in cooperation with the internal control program and the external control program.

Moreover, in this embodiment, the face image file stored in the face dictionary folder is used for creating the face dictionary for folder-comparing FFDC. However, in a folder selecting screen etc. upon reproducing the image file, the face image included in the face image file may be displayed on the LCD monitor 28 instead of the folder name. Moreover, in this embodiment, the present invention is explained by using a digital still camera, however, cell phone units, a smartphone, a digital video camera and a personal computer may be applied to.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory computer-readable medium storing a computer program which, when executed by a processor of an image management apparatus, causes the processor to execute a method, comprising:
    designating each of one or at least two characteristic images included in a photographed image as a reference characteristic image;
    searching for a specific folder having a dictionary image adapted to the reference characteristic image associated with the specific folder, from among one or at least two folders in which one or at least two dictionary images are respectively associated with;
    storing the photographed image noticed based on said designating instruction into the specific folder discovered based on said searching instruction;
    creating a folder having a dictionary image equivalent to the reference characteristic image associated with the created folder, corresponding to non-discovering the specific folder based on said searching instruction; and
    storing the photographed image noticed based on said designating instruction into the folder created based on said first creating instruction, in association with a creating process of said first creating instruction.

2. An image managing method executed by an image management apparatus, said image managing method, comprising:
    a designating step of designating each of one or at least two characteristic images included in a photographed image as a reference characteristic image;
    a searching step of searching for a specific folder having a dictionary image adapted to the reference characteristic image associated with the specific folder, from among one or at least two folders in which one or at least two dictionary images are respectively associated with;
    a first storing step of storing the photographed image noticed by said designating step into the specific folder discovered by said searching step;
    a first creating step of creating a folder having a dictionary image equivalent to the reference characteristic image associated with the created folder, corresponding to non-discovering the specific folder by said searching step; and
    a second storing step of executing a process of storing the photographed image noticed by said designating step into the folder created by said first creating step, in association with a creating process of said first creating step.

3. An image management apparatus, comprising:
    a processor;
    a memory coupled to the processor, the memory storing a program that, when executed, causes the processor to be configured to operate as
        a designator which designates each of one or at least two characteristic images included in a photographed image as a reference characteristic image;
        a searcher which searches for a specific folder having a dictionary image adapted to the reference characteristic image associated with the specific folder, from among one or at least two folders in which one or at least two dictionary images are respectively associated with;
        a first storer which stores the photographed image noticed by said designator into the specific folder discovered by said searcher;
        a first creator which creates a folder having a dictionary image equivalent to the reference characteristic image associated with the created folder, corresponding to non-discovering the specific folder by said searcher; and
        a second storer which executes a process of storing the photographed image noticed by said designator into the folder created by said first creator, in association with a creating process of said first creator.

4. An image management apparatus, comprising
    a processor;
    a memory;
    an accessor which accesses a recording medium holding one or at least two folders in which one or at least two dictionary images are respectively associated with;
    a designator which designates each of one or at least two characterstic images appeared on a photographed image as a reference characteristic image;
    a calculator which calculates a matching degree between the reference characteristic image and each of the one or at least two dictionary images;
    a searcher which searches for a specific folder in which a dictionary image equivalent to the reference characteristic image is associated with, from among the one or at least two folders, based on a calculated result of said calculator;
    a first storage which stores the photographed image into the specific folder detected by said searcher; and
    a first creator which creates in said recording medium a folder in which a dictionary image equivalent to the reference characteristic image is associated with and the photographed image is stored, corresponding to non-detection by said searcher, wherein said searcher includes a first folder detector which detects a folder in which a common dictionary image is associated with as the specific folder when the number of reference characteristic images in which a matching degree with the common dictionary image exceeds a reference is more than one, and said image management apparatus, further comprising a second creator which creates in said recording medium a folder in which a dictionary image equivalent to the reference characteristic image different from the reference characteristic image corresponding to a maximum matching degree, out of the reference characteristic images noticed by said first folder detector, is associated with and the photographed image is stored.

5. An image management apparatus according to claim 4, wherein said searcher further includes a selector which selects a dictionary image corresponding to a maximum matching degree when the number of dictionary images in which a matching degree with a common reference characteristic image exceeds a reference is more than one, and a second folder detector which detects a folder in which the dictionary image selected by said selector is associated with as the specific folder.

6. A computer program recorded on a non-transitory recording medium in order to control an image management apparatus provided with an accessor which accesses a recording medium holding one or at least two folders in which one or at least two dictionary images are respectively associated with, causing a processor of the image management apparatus to execute the steps comprising:

a designating step of designating each of one or at least two characteristic images appeared on a photographed image as a reference characteristic image;

a calculating step of calculating a matching degree between the reference characteristic image and each of the one or at least two dictionary images;

a searching step of searching for a specific folder in which a dictionary image equivalent to the reference characteristic image is associated with, from among the one or at least two folders, based on a calculated result of said calculating step;

a first storing step of storing the photographed image into the specific folder detected by said searching step; and a first creating step of creating in said recording medium a folder in which a dictionary image equivalent to the reference characteristic image is associated with and the photographed image is stored, corresponding to non-detection by said searching step, wherein said searching step includes a folder detecting step of detecting a folder in which a common dictionary image is associated with as the specific folder when the number of reference characteristic images in which a matching degree with the common dictionary image exceeds a reference is more than one, and the steps executed by said processor, further comprising a second creating step of creating in said recording medium a folder in which a dictionary image equivalent to the reference characteristic image different from the reference characteristic image corresponding to a maximum matching degree, out of the reference characteristic images noticed by said folder detecting step, is associated with and the photographed image is stored.

7. An image management method executed by an image management apparatus provided with an accessor which accesses a recording medium holding one or at least two folders in which one or at least two dictionary images are respectively associated with, comprising:

a designating step of designating each of one or at least two characteristic images appeared on a photographed image as a reference characteristic image;

a calculating step of calculating a matching degree between the reference characteristic image and each of the one or at least two dictionary images;

a searching step of searching for a specific folder in which a dictionary image equivalent to the reference characteristic image is associated with, from among the one or at least two folders, based on a calculated result of said calculating step;

a first storing step of storing the photographed image into the specific folder detected by said searching step; and a first creating step of creating in said recording medium a folder in which a dictionary image equivalent to the reference characteristic image is associated with and the photographed image is stored, corresponding to non-detection by said searching step, wherein said searching step includes a folder detecting step of detecting a folder in which a common dictionary image is associated with as the specific folder when the number of reference characteristic images in which a matching degree with the common dictionary image exceeds a reference is more than one, and the image management method, further comprising a second creating step of creating in said recording medium a folder in which a dictionary image equivalent to the reference characteristic image different from the reference characteristic image corresponding to a maximum matching degree, out of the reference characteristic images noticed by said folder detecting step, is associated with and the photographed image is stored.

8. An image management apparatus according to claim 3, wherein said searcher includes a calculator which calculates a matching degree between the reference characteristic image and each of the one or at least two dictionary images, and a determiner which determines the specific folder based on a calculated result of said calculator.

9. An image management apparatus according to claim 8, wherein said determiner includes a first selector which selects a dictionary image corresponding to a maximum matching degree when the number of dictionary images in which a matching degree with a common reference characteristic image exceeds a reference is equal to or more than two, and a first specific folder determiner which determines a folder in which the dictionary image selected by said first selector is associated with as the specific folder.

10. An image management apparatus according to claim 8, wherein said determiner includes a second selector which selects a reference characteristic image corresponding to a maximum matching degree when the number of reference characteristic images in which a matching degree with a common dictionary image exceeds a reference is equal to or more than two, and a second specific folder determiner which executes a process of determining a folder in which the common dictionary image is associated with as the specific folder in association with a selecting process of said second selector, and said image management apparatus further comprising:

a second creator which creates a folder in which a dictionary image equivalent to the reference characteristic image different from the reference characteristic image selected by said second selector, out of the reference characteristic images which are equal to or more than two, is associated with; and a third storer which executes a process of storing the photographed image noticed by said designator into the folder created by said second creator, in association with a creating process of said second creator.

* * * * *